(12) United States Patent
Hein et al.

(10) Patent No.: US 7,210,652 B2
(45) Date of Patent: May 1, 2007

(54) DUAL ACTION INLET DOOR AND METHOD FOR USE THEREOF

(75) Inventors: Jeffrey M. Hein, Tempe, AZ (US); Nicholas A. Williams, Phoenix, AZ (US); Yogendra Y. Sheoran, Scottsdale, AZ (US); Cecilia S. Lam, Scottsdale, AZ (US); Ora Morency Cowans, Los Angeles, CA (US); Benjamen Kurt Higuera, Oracle, AZ (US); Andrew Stephen Peduchi, Tucson, AZ (US); Ravisha Pramod Sellahewa, Los Gatos, CA (US); Daniel Brown, Surprise, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/299,116

(22) Filed: Dec. 8, 2005

(65) Prior Publication Data
US 2006/0102781 A1 May 18, 2006

Related U.S. Application Data

(62) Division of application No. 10/789,827, filed on Feb. 27, 2004, now Pat. No. 7,014,144.

(60) Provisional application No. 60/489,412, filed on Jul. 22, 2003.

(51) Int. Cl.
*B64D 33/02* (2006.01)

(52) U.S. Cl. .................................. 244/53 B

(58) Field of Classification Search ............. 244/53 B, 244/129.4, 129.5; 137/15.1, 15.2; 49/192, 49/193; 60/270.1
See application file for complete search history.

(56) References Cited

U.S. PATENT DOCUMENTS 2,695,074 A 11/1954 Kelly
2,944,631 A 7/1960 Kerry et al.

(Continued)

FOREIGN PATENT DOCUMENTS

| EP | 0 743 247 A | 11/1996 |
|---|---|---|
| EP | 1 069 044 A | 1/2001 |
| GB | 1 212 875 A | 11/1970 |

OTHER PUBLICATIONS

PCT International Search Report PCT/US2004/023220, Nov. 22, 2005.

*Primary Examiner*—Tien Dinh
(74) *Attorney, Agent, or Firm*—Ingrassia Fisher & Lorenz

(57) ABSTRACT

An inlet door assembly and method for reducing noise from an auxiliary power unit (APU) contained within an aircraft housing is provided. The inlet assembly includes an inlet duct, an actuator, and a door. The inlet duct is configured to extend from the auxiliary power unit to the aircraft housing and has a sidewall that defines a flow passage through which APU noise propagates. The actuator is disposed at least partially within the inlet duct. The door coupled to the actuator. The actuator is also configured to selectively rotate the door between at least a first position, in which at least a portion of the door deflects APU noise in a first direction, and a second position, in which at least a portion of the door deflects the APU noise in a second direction.

1 Claim, 10 Drawing Sheets

U.S. PATENT DOCUMENTS

| | | |
|---|---|---|
| 4,346,860 A | 8/1982 | Tedstone |
| 4,397,431 A | 8/1983 | Ben-Porat |
| 4,418,879 A | 12/1983 | Vanderleest |
| 4,655,413 A | 4/1987 | Genssler et al. |
| 4,899,958 A | 2/1990 | Horikawa |
| 5,694,763 A | 12/1997 | Amelio et al. |
| 5,697,394 A | 12/1997 | Smith et al. |
| 6,082,669 A | 7/2000 | Bardagi et al. |
| 6,094,907 A | 8/2000 | Blackner |
| 6,106,228 A | 8/2000 | Bartlett |
| 6,247,668 B1 | 6/2001 | Reysa et al. |
| 6,264,137 B1 | 7/2001 | Sheoran |
| 6,272,838 B1 | 8/2001 | Harvell et al. |
| 6,349,899 B1 | 2/2002 | Ralston |
| 6,565,035 B1 | 5/2003 | Kim et al. |

DUAL ACTION INLET DOOR AND METHOD FOR USE THEREOF

CROSS-REFERENCES TO RELATED APPLICATIONS

This application claims the benefit of U.S. Provisional Application No. 60/489,412, filed Jul. 22, 2003. This application is a divisional of Ser. No. 10/789,827 filed on Feb. 27, 2004 now U.S. Pat. No. 7,014,144.

FIELD OF THE INVENTION

The present invention relates to aircraft inlet doors, more particularly, inlet doors for use in the reduction of auxiliary power unit noise.

BACKGROUND OF THE INVENTION

Auxiliary power units ("APU") are used in aircrafts to provide electrical power and compressed air to various parts of therein. When an aircraft is on the ground, its main source of electrical power comes from the APU. In particular, the APU can power the environmental control systems, air drive hydraulic pumps, and the starters for the engines. When an aircraft is in flight, the APU may provide pneumatic and/or electric power to the aircraft.

Typically, APUs are located in the aft section of the aircraft, at or near the tailcone section and include inlet and exhaust ducting that exit through an opening in the aircraft fuselage to allow sufficient air flow through to the APU. For aircrafts on which APUs operate during flight, a ram air door is typically provided to protect the APU from foreign object damage when not in use and/or during ground movement, and to maximize airflow into the APU when performance at altitude is required. Thus, when APU venting is desired, the ram air door opens, either on the ground or in flight. Typically in such configuration, the ram air door is configured to open around 45 degrees, relative to the aircraft fuselage, so that aircraft drag and entry of foreign objects into the inlet duct are minimized, while ram air recovery is optimized.

However, while the ram air door is open, noise may propagate from the APU outward from the aircraft fuselage. The noise typically travels through the inlet duct and is deflected from the interior of the ram air door to sections forward the tailcone or service locations that are located in the forward section of the aircraft. Because many aircraft sections are located forward of the APU, such as, for example, passenger doors, passenger and aircraft personnel cabins, refueling points and baggage doors, audible noise levels heard by those onboard the aircraft or those on the ground while handling baggage or performing aircraft maintenance may be increased.

Therefore, there is a need for an air inlet door that does not enhance forward propagation of inlet noise when the aircraft is on the ground. Moreover, in some cases, it is desirable for the inlet door to deflect foreign objects when the inlet door is open and while providing ram air recovery in flight. Additionally, it would be beneficial for the inlet door to cover the fuselage opening while the APU is not in operation. The present invention addresses one or more of these needs.

SUMMARY OF THE INVENTION

The present invention provides an inlet door assembly for reducing noise from an auxiliary power unit (APU) contained within an aircraft. The inlet door assembly includes a duct and a door. The duct has an inlet port, an outlet port, and a flow passage therebetween through which APU noise propagates. The door is rotationally mounted on the duct and configured to selectively rotate between at least a first position, in which at least a portion of the door deflects the APU noise in a first direction, and a second position, in which at least a portion of the door deflects the APU noise in a second direction.

In one embodiment, and by way of example only, a method for reducing APU noise from an APU located within an aircraft by an inlet door assembly during aircraft in-flight and ground operations is provided. An inlet door assembly comprising a duct having an inlet port, an outlet port, and a flow passage therebetween through which APU noise propagates, forward and aft doors each rotationally mounted on the duct and configured to selectively rotate between at least a first position, in which at least a portion of the door deflects APU noise in a first direction, and a second position, in which at least a portion of the door deflects the APU noise in a second direction, is used. The method includes the steps of pivoting the aft door out of the flow passage and pivoting the forward door into the flow passage, during aircraft in-flight operation, pivoting the forward door out of the flow passage, while the aft door remains out of the flow passage, and pivoting the aft door into the flow passage, while the forward door remains out of the flow passage, during aircraft ground operation.

Other independent features and advantages of the preferred inlet door assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description of the various embodiments, it is to be appreciated that the air inlet assemblies described below may be used in conjunction with various types of gas turbine engines, such as an aircraft turbofan jet engine, and various types of aircrafts, watercrafts and ground-based installations. The skilled artisan will appreciate that, although the present invention is, for convenience of explanation, depicted and described as being implemented in the context of an auxiliary power unit, it will be appreciated that it can be implemented with other sections of an engine as well. Additionally, as used herein, like numerals refer to like parts.

Figure 1:
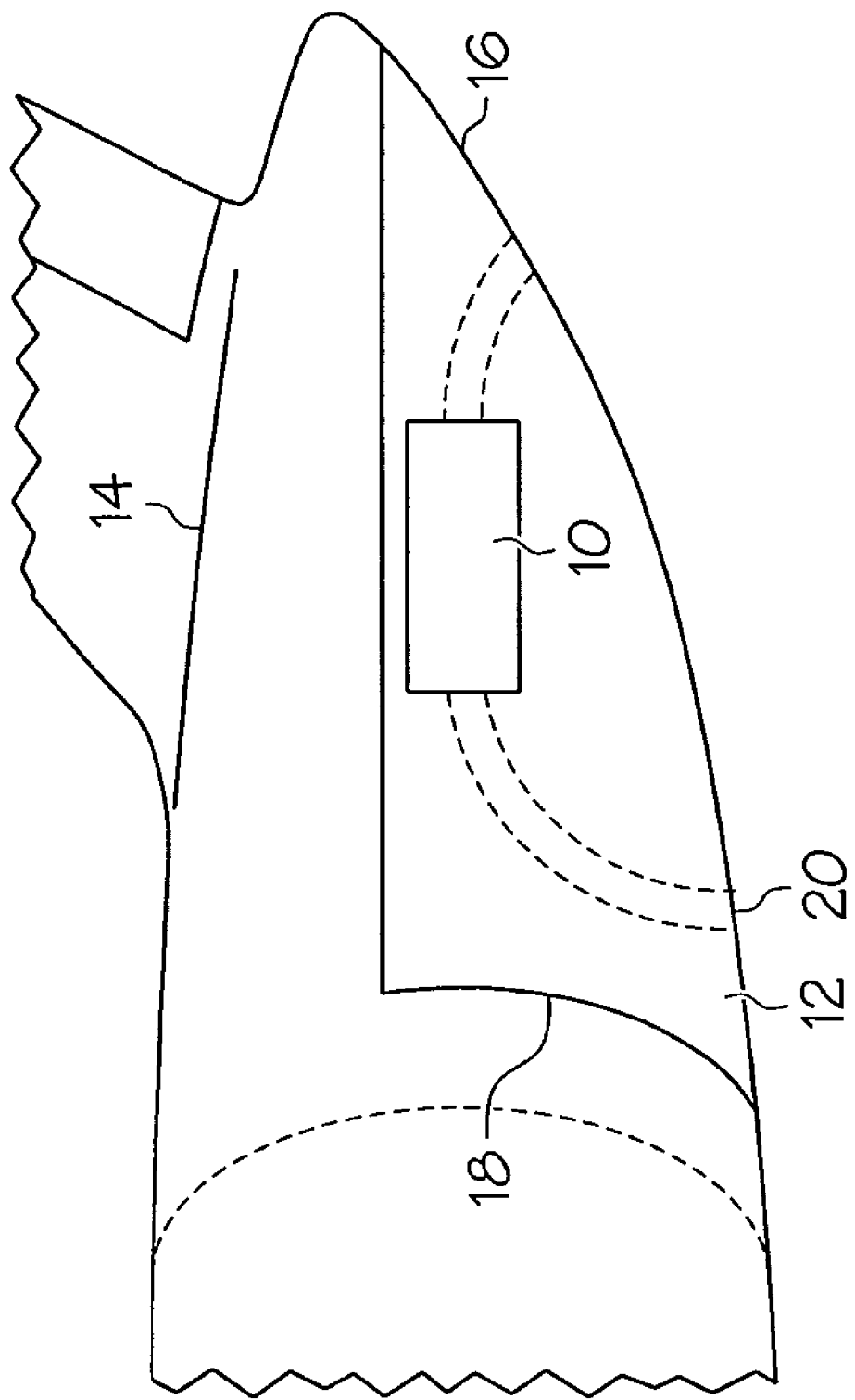
FIG. 1 is a cross-sectional schematic showing an auxiliary power unit (APU) mounted in the tailcone of an airplane.

Turning now to the description and with reference first to FIG. 1, a cross-sectional schematic of an auxiliary power unit (APU) 10 is shown mounted in the tailcone of an aircraft. The aircraft 14 includes a compartment 12 that is defined by the aircraft exterior surfaces 16 and a firewall 18. The exterior surface 16 includes an intake opening 20 that communicates with the APU 10 via an inlet duct 21 (shown in FIG. 2). Although the inlet duct 21 and intake opening 20 are shown positioned on the underside of the aircraft, it will be appreciated that both may be located anywhere on the aircraft depending on the aircraft configuration. The firewall 18 separates the compartment 12 from the rest of the aircraft fuselage. The APU 10 is disposed within the compartment 12.

Figure 2:
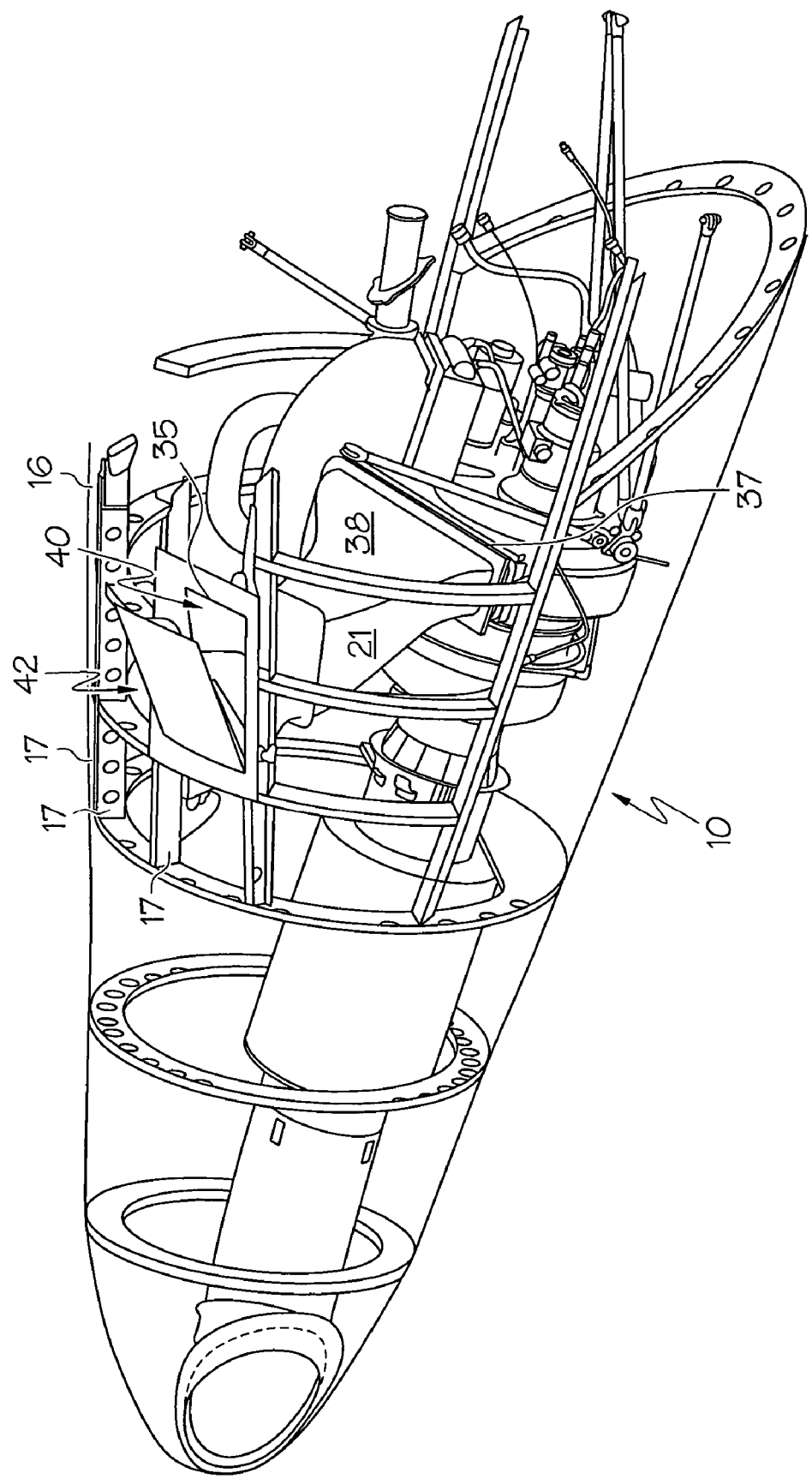
FIG. 2 is a perspective view of the inlet duct portion of an exemplary gas turbine APU 10.

With reference to FIG. 2, the duct 21 includes an inlet port 35, an outlet port 37, and a sidewall 38 that defines a flow passage 40 through which the air passes and an inlet door assembly 42 that is mounted thereon. The amount of air that is ingested is controlled by the inlet door assembly 42. The inlet door assembly 42 also controls the amount of noise that propagates from the APU 10 to the ambient environment.

Figure 3A:
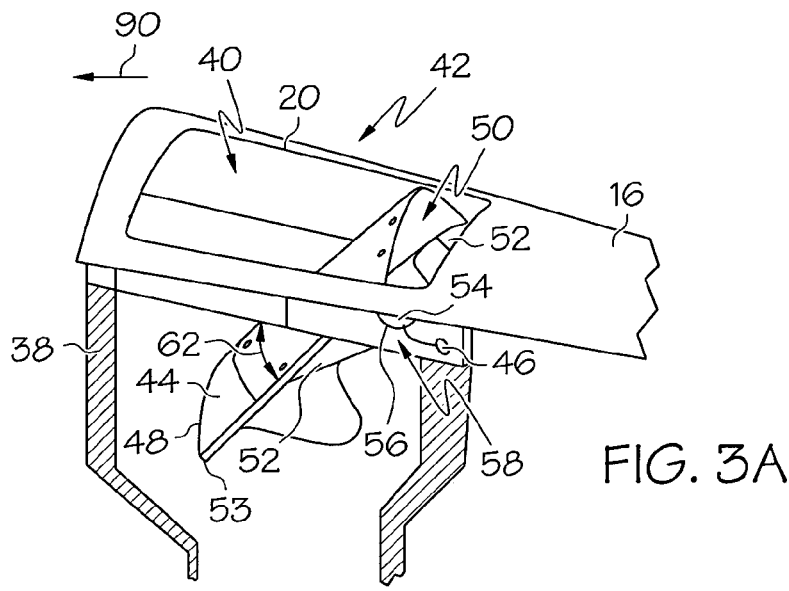
FIGS. 3A–3C are perspective views of the APU inlet duct having an exemplary inlet door assembly mounted thereon.

Referring now to FIG. 3A for general reference only, an exemplary inlet door assembly 42 is depicted. The inlet door assembly 42 generally includes a door 44 coupled to an actuator 46. The door 44 preferably includes first and second sides or ends 48, 50 and a seal 53 that is configured to sealingly couple the door 44 to the inlet opening 20 when the door 44 is in a closed position. The door 44 is rotationally mounted to the duct 21, and can be mounted to the duct sidewall 38, outlet port 35, or may be mounted to the aircraft 16, such that at least a portion of the door 44 is rotatable between at least two positions, for example, into and out of the inlet duct flow passage 40. To this end, any portion of the door 44 may be rotationally coupled to the inlet duct 21. In one preferred embodiment, the midsection of the door 44 is rotationally coupled to the duct 21 so that when the door 44 is rotated in one direction, the door first end 48 is rotated into the inlet duct flow passage 40, and the door second end 50 is rotated out of the inlet duct flow passage 30, and vice versa when the door 44 is rotated in the other direction. In yet another embodiment, either the door first or second end 48, 50 is mounted to the duct 21. In such an embodiment, the other door end can rotate into and out of the inlet duct flow passage 40. In an alternative embodiment, the door 44 may be coupled only to the actuator 46.

The actuator 46 is configured to move the door 44 between a first position, in which at least a portion of the door 44 deflects the APU air flow in a first direction, and a second position, in which at least a portion of the door 44 deflects the air flow in a second direction. Alternatively, the actuator 46 is configured to move at least a portion of the door 44 into and out of the inlet duct flow passage 40. In yet another alternative embodiment, the actuator 46 is configured to first raise the door 44 away from the aircraft surface 16 and then rotate the door 44. Different types of actuators may be used depending on the inlet door assembly configuration. For instance, the actuator 46 can be a linear or rotary actuator, but may be one of numerous other types of mechanisms configured to actuate a door, including but not limited to piston assemblies, rack and pinion gear assemblies, multi-component linkages, and springs.

Figure 3B:
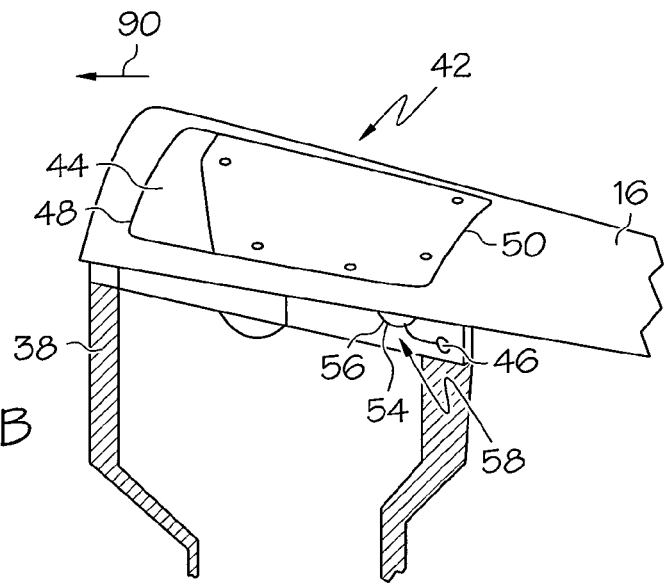
Figure 3C:
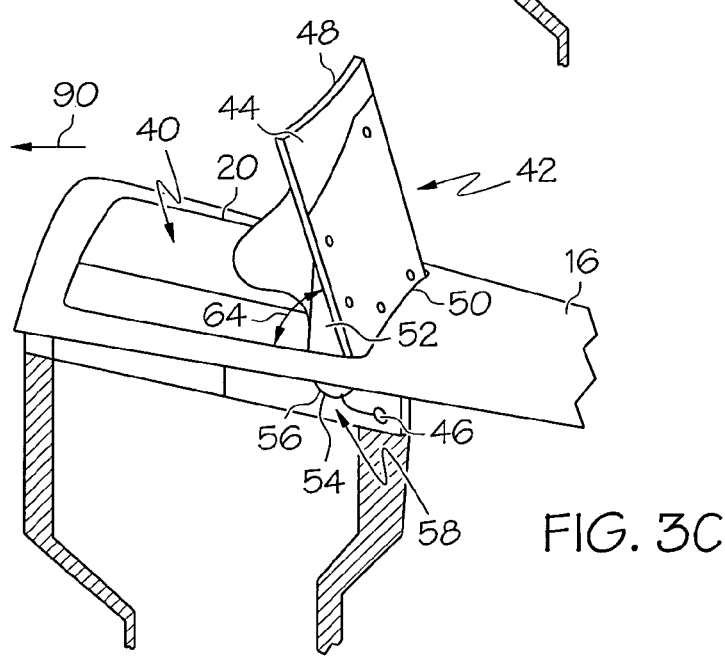

Turning now to FIGS. 3A–3C, in the embodiment depicted therein, the inlet door assembly 42 includes a door 44 having first and second sides 48, 50, and a pair of arms 52 that each includes an opening 54 located proximate the door second side 50 that receives a coupling mechanism 56, such as a screw, or other type of mechanism configured to rotationally couple the door 44 to the actuator 46. The actuator 46 includes a mounting surface 58, to which the door 44 is coupled, and is in communication, either electrically, pneumatically, or hydraulically, with a control circuit, an electronic control unit (ECU), or any one of numerous other types of control mechanisms (not shown) that communicates door 44 position commands to the actuator 46. The actuator 46 is further mounted to the inlet duct 21, or alternatively, the sidewall 38, or to the aircraft 16, and is configured to cause the door first side 48 to rotate into and out of the inlet duct flow passage 40. The door first side 48 preferably rotates between −90 degress and +90 degrees, relative to the aircraft surface 16 so that sufficient ambient air is allowed into the inlet duct flow passage 40 when desired, while APU noise is reduced.

FIG. 3A illustrates the door 44 of the inlet door assembly 42 in an inward open position. The inward open position is used while the aircraft is on the ground and allows noise to propagate directly out of the inlet duct 21 minimizing deflection forward 90 the aircraft. When the inward open position is desired, the control circuit (not shown) communicates the desired position to the actuator 54, which then actuates the door 44 to a desired angle 62 causing the door second side 50 to actuate inward while the aircraft relative to the aircraft surface 16 and specifically, into the inlet duct 21. Thus, when the noise exits the inlet duct 21, it partially deflects off of the inner surface of the door 44 and bounces back into the inlet duct flow passage 40. Additionally, when the aircraft is taxiing on the ground, the outer surface of the door 44 acts as a shield to deflect foreign objects from the inlet duct 21 and prevent damage thereto.

When the APU is not operating, such as during portions of flight, the inlet duct 21 is closed, as shown in FIG. 3B. The door 44 is preferably in a closed position to lower aircraft drag. When the door 44 is actuated from the inward position shown in FIG. 3A, the control circuit (not shown) communicates to the actuator 46 to close the door 44 by causing the door first side 48 to rotate until the door 44 is flush against the aircraft surface 16. Most preferably, the door 44 and the inlet duct 21 sealingly couple to one another so that foreign objects do not enter into the inlet duct 21 to damage the APU.

During flight, it may be desirable to open the door 44 outward, such as shown in FIG. 3C. The outward position is used to achieve ram air recovery while minimizing aircraft drag when the aircraft is in flight. As with the other two positions, the control circuit (not shown) communicates the desired outward position to the actuator 46. In response, the actuator 46 causes the door 44 to actuate so that the door first side 48 rotates until it extends outward at a desired angle 64, relative to the aircraft surface 16. During flight, APU noise is not as much of an issue and thus, in this embodiment, will be partially deflected forward the aircraft 90. As may be appreciated, the door 44 may be opened to any angle so as to maximize ram air recovery.

As will be appreciated, the door 44 may also be actuated from the closed position in FIG. 3B to the open position shown in FIG. 3A, or from the open position in FIG. 3C to the closed position of FIG. 3B. Additionally, the door 44 may also be actuated from the position shown in FIG. 3A directly to the position of FIG. 3C, via the position in FIG. 4B.

Figure 4A:
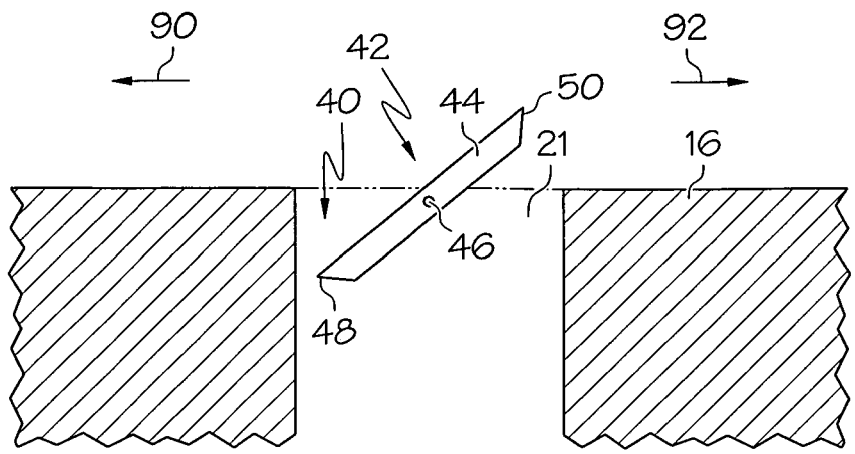
FIGS. 4A–4C are schematics of the APU inlet duct having another exemplary inlet door assembly mounted thereon.
Figure 4B:
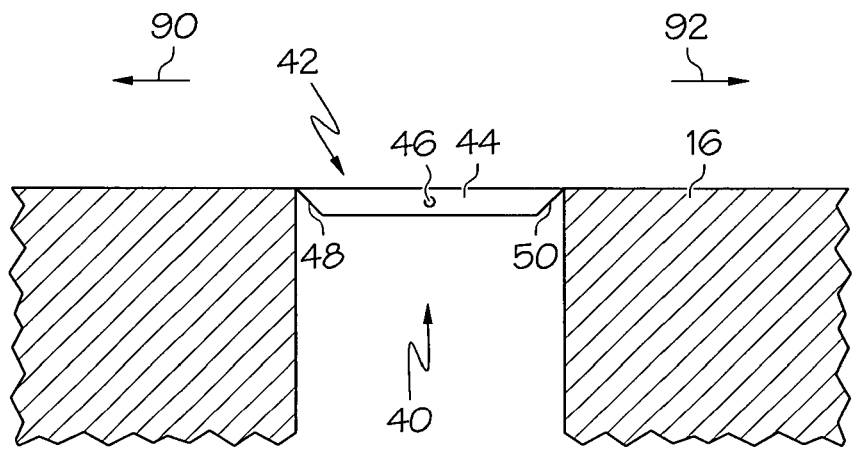
Figure 4C:
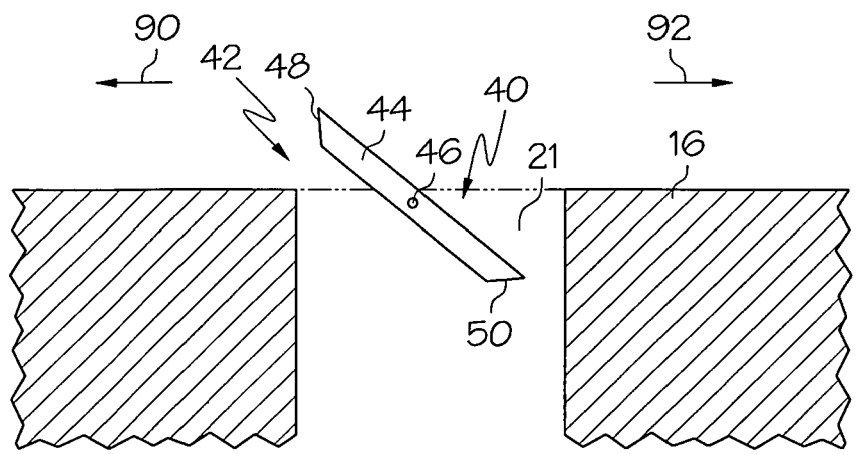

FIGS. 4A–4C illustrates another exemplary inlet door assembly 42 that can be used on the inlet duct 21 of an APU 10. In this embodiment, the inlet assembly 42 includes a door 44. The door 44 includes a first, or "forward" side 48 and a second, or "aft" side 50. The door 44 is coupled to the inlet duct 21 at its midsection, such that the forward and aft sides 48, 50 pivot into and out of the inlet duct flow passage 40. The door 44 is actuated by an actuator (not shown) that is coupled to the door midsection. The actuator communicates with a control circuit (not shown) and is configured to receive door position commands from the control circuit to cause the door 44 to rotate. The actuator is further configured to rotate the door 44 in several positions. For instance, the actuator can be configured to cause the forward side 48 to pivot out of the inlet duct flow passage 40 causing the aft side 50 to pivot into the inlet duct flow passage 40 as shown in FIG. 4A. This configuration is used so that the outer surface of the door 44 acts as a shield to deflect unwanted objects from the inlet duct, while also deflecting the APU noise in the directions of the flow passage 40 or aft the aircraft 92. The actuator can be also configured to cause the forward side 48 to pivot into the inlet duct flow passage 40 while the aft side 50 pivots out of the inlet duct flow passage 40 for aircraft in-flight operation, as shown in FIG. 4C. Here, the door 44 scoops and directs the ambient air into the flow passage 40, while deflecting the APU noise forward 90 and into the flow passage 40. Additionally, the actuator 46 can be configured to cause the door 44 to lay flush with the aircraft surface 16 when the APU is not in operation, illustrated in FIG. 4B.

Figure 5A:
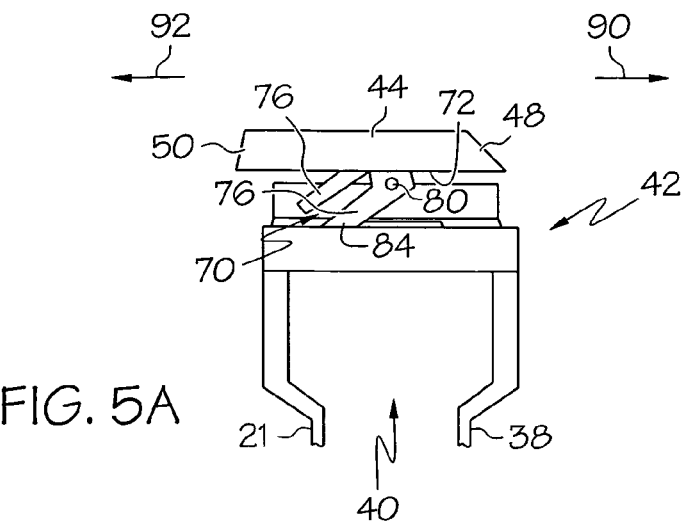
FIGS. 5A–5C are schematics of the APU inlet duct having another exemplary inlet door assembly mounted thereon
Figure 5B:
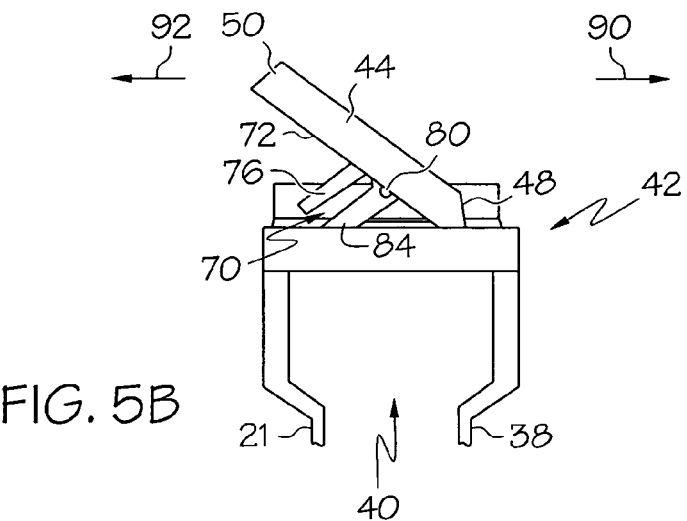
Figure 5C:
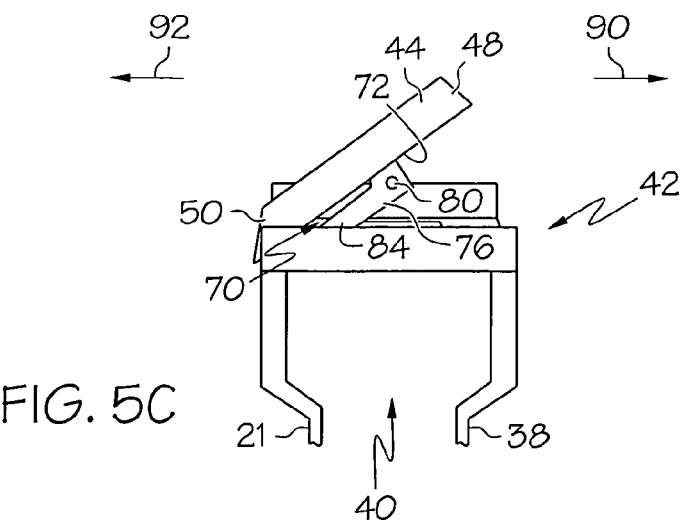

FIGS. 5A–5C illustrate a variation of the exemplary inlet door assembly 42 provided in FIGS. 4A–4C. In the embodiment depicted in FIGS. 5A–5C, the inlet door assembly 42 includes a door 44 and an actuating mechanism 70. The door 44 is a single structure configured to sealingly couple to the inlet duct 21 when in the closed position. The door 44 also includes a first, or "forward" side 48 and a second, or "aft" side 50 and a mounting surface 72 coupled to and located on the underside thereof. The mounting surface 72 couples to the actuating mechanism 70 so that when the door 44 pivots, either the forward or aft side 48, 50 can contact the inlet duct 21. The actuating mechanism 70 includes a pair of arms 76 that each have first and second ends 80, 84. The first ends 80 are coupled to the door mounting surface 72. The mounting surface 72 and arm first ends 80 are each configured to operate with one another to allow the door 44 to pivot on top of the arm first ends 80. The arm second ends 84 are each coupled to an actuator (not shown) and the door aft side 50. As will be appreciated, the arm second ends 84 may alternatively be coupled to the door forward side 48.

The actuators can be any one of numerous types of actuators that may be configured to move the arms 76 to thereby cause the arms 76 to actuate, and as a result, to pivot the door 44. Alternatively, the actuators can incorporate a piston mechanism located below the mounting surface 72 that is configured to raise and lower the door 44 relative to the aircraft surface (not shown), and another type of mechanism configured to cause the door 44 to pivot atop the arm second ends 84. In yet another alternative, the actuator can incorporate a rack and pinion arrangement configured to raise and lower the door 44. The actuators are preferably coupled to the inlet duct 21 but, as will be appreciated, the actuators may be coupled to or mounted on any portion of the inlet door assembly 42. The actuators are preferably in communication with a control circuit, electronic control unit or any other type of controller (not shown) configured to communicate door position commands to the actuators 46.

When the aircraft is not in flight, the door 44 is preferably in a closed position and sealingly coupled to the inlet duct 21. However, if the APU is in operation, the door 44 is preferably in a raised position, shown in FIG. 5A. In such case, the control circuit (not shown) communicates the desired position commands to the actuator to cause the door 44 to lift away from the aircraft surface. The actuator causes the arm 76 to actuate out of the inlet duct flow passage 40.

During ground operation, it may be desirable for the door 44 to be open aft 92, as shown in FIG. 5B. The control circuit (not shown) communicates the desired position to the actuator which caused the door 44 to pivot on top of the arm second end 84 so that the door forward side 48 contact the inlet duct 21 while the door aft side 50 is opened out of the flow passage 40. Meanwhile, the arm 76 itself remains fixed in the open door position depicted previously in FIG. 5A so that the door 44 continues to be lifted away from the aircraft surface 16. This aft open configuration allows ambient air to enter into the inlet duct 21 while deflecting noise aft 92. Such configuration is desirable when the APU is in operation and the aircraft is taxiing on the ground. The door 44 acts as a shield to prevent foreign objects from entering into the inlet duct 21 and damaging the APU.

The door 44 can also open forward 90, such as shown in FIG. 5C. The forward open door configuration is desirable when the aircraft is in flight and maximum ram air recovery is desired. To this end, the control circuit (not shown) communicates the desired position to the actuator which causes the door 44 to pivot on top of the arm second end 84 so that the door forward side 48 is out of the inlet duct flow passage 40 while the door aft side 50 contacts the inlet duct 21. Meanwhile, the arm 76 itself remains fixed in the open door position depicted previously in FIG. 5A so that the door 44 continues to be lifted away from the aircraft surface 16. Thus, the door 44 acts as a scoop to receive ambient air into the inlet duct 21.

One of many advantages to the configurations depicted in FIGS. 5A–5C is that the APU can be in operation at any time during flight or on the ground, the reason being that the door 44 can remain in an open position, as shown in FIG. 5A, during the transition between the aft and forward positions, shown in FIG. 5B and 5C.

Figure 6A:
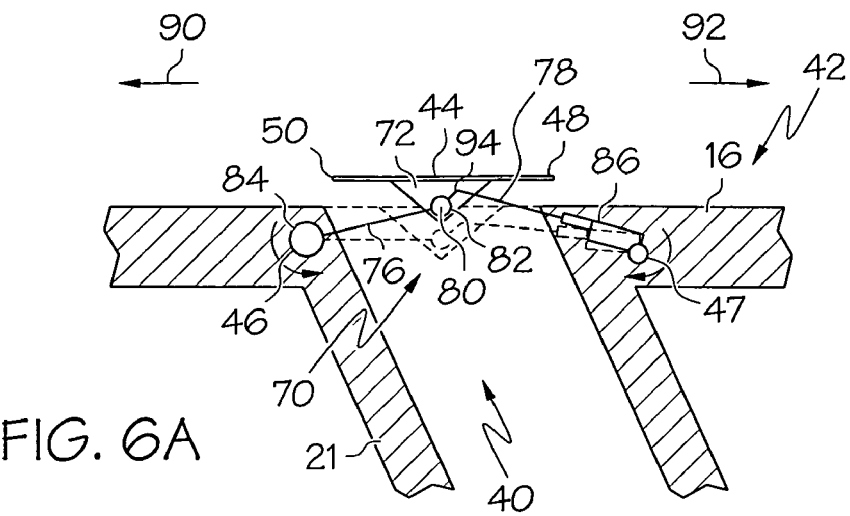
FIGS. 6A–6C are schematics of the APU inlet duct having yet another exemplary inlet door assembly mounted thereon.

FIGS. 6A–6O schematically illustrates yet another variation of the exemplary inlet door assembly 42 shown in FIGS. 4A–4C. Here, the inlet door assembly 42 includes a door 44 and an actuating mechanism 70. The door 44 also includes a first, or "forward" side 48 and a second, or "aft" side 50 and a mounting surface 72 coupled to and located on the underside thereof. The mounting surface 72 couples to the actuating mechanism 70 so that when the door 44 pivots either forward or aft side 48,50 can contact the inlet duct 21. The actuating mechanism 70 includes two arms 76, 78, each having a first ends 80, 82 that couple to the door mounting surface 72. The mounting surface 72 and arm first ends 80, 82 are each configured to operate with one another to allow the door 44 to pivot on top of the arm first ends 80, 82. To this end, each arm 76, 78 has a second end 84, 86. The first arm second end 84 couples to one actuator.46, while the second arm second end 86 includes an extension portion 94 that is coupled to a second actuator 47.

The actuators 46, 47 can be any one of numerous types of actuators that can be configured to move the arms 76, 78 to thereby cause the arms 76, 78 to actuate, and as a result, to pivot the door 44. Alternatively, one of the actuator can be a piston mechanism located below the mounting surface 72 that is configured to raise and lower the door 44 relative to the aircraft surface 16, while the other actuator is configured to cause the door 44 to pivot atop the second arm second end 86. In yet another alternative, the first actuator can be a rack and pinion arrangement configured to raise and lower the door 44. Each actuator 46, 47 is preferably coupled to the inlet duct 21 but, as will be appreciated, the actuators 46, 47 may be coupled to or mounted on any portion of the inlet door assembly 42. The actuators 46, 47 is preferably in communication with a control circuit, electronic control unit or any other type of controller (not shown) configured to communicate door position commands to the actuators 46, 47.

When the aircraft is not in flight, the door 44 is preferably in a closed position and sealingly coupled to the inlet duct 21. This is illustrated in phantom in FIG. 6A. However, if the APU is in operation, the door 44 is preferably in a raised position, also shown in FIG. 6A. In such case, the control circuit (not shown) communicates the desired position commands to the first actuator 46 causes the arm 76 to actuate partially out of the inlet duct flow passage 40. As a result, the second arm 78 actuates partially out of the inlet duct flow passage 40 as well, the extension portion 94 extends to compensate for the second arm 78 outward movement, and the door 44 is lifted and positioned out of the inlet duct flow passage 40.

Figure 6B:
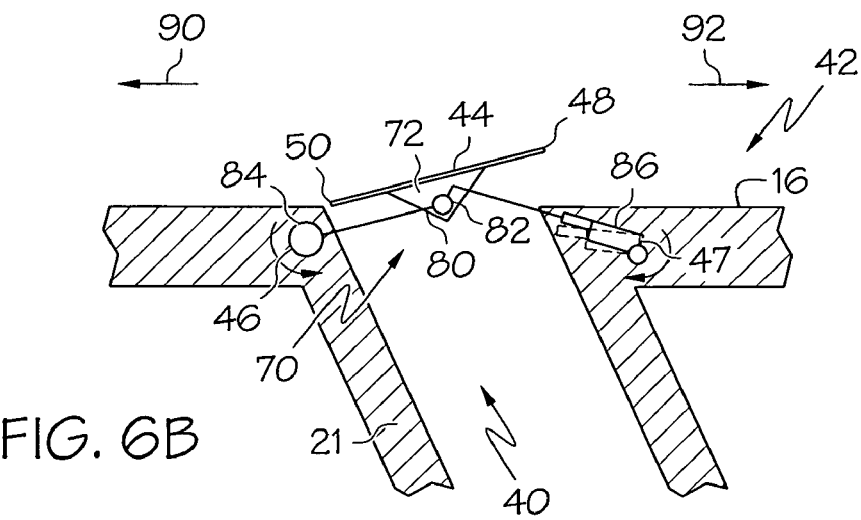

During ground operation, it may be desirable for the door 44 to be open aft 92, as shown in FIG. 6B. The control circuit (not shown) communicates the desired position to the second actuator 47 which causes the extension portion 94 to pivot the door 44 on top of the arm second ends 84, 86 so that the door aft side 50 contacts the inlet duct 21 while the door forward side 48 is opened out of the flow passage 40. Meanwhile, the first arm 76 itself remains fixed in the open door position depicted previously in FIG. 6A so that the door 44 continues to be lifted away from the aircraft surface 16. This aft open configuration allows ambient air to enter into the inlet duct 21 while deflecting noise aft 92. Such configuration is desirable when the APU is in operation and the aircraft is taxiing on the ground. The door 44 acts as a shield to prevent foreign objects from entering into the inlet duct 21 and damaging the APU.

Figure 6C:
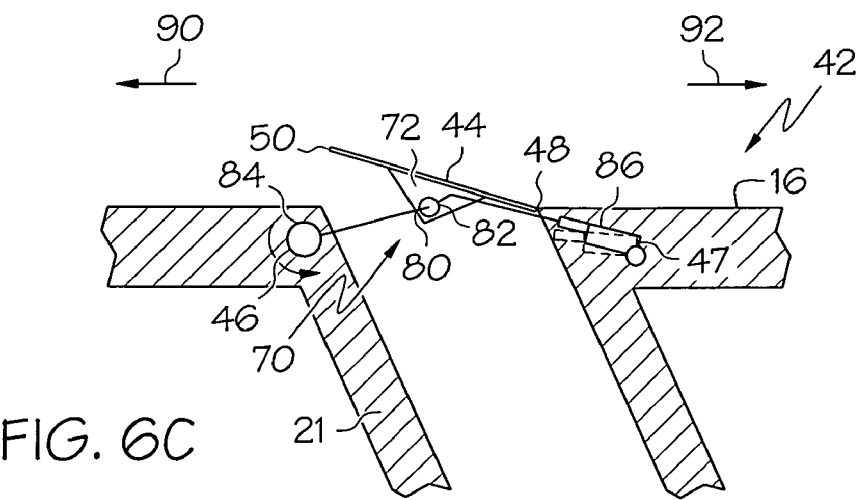

The door 44 can also open forward 90, such as shown in. FIG. 6C. The forward open door configuration is desirable when The aircraft is in flight and maximum ram air recovery is desired. To this end, the control circuit (not shown) communicates the desired position to the second actuator 47 which causes the extension portion 94 to pivot the door 44 on top of the arm second ends 84, 86 so that the door aft side 50 is out of the inlet duct flow passage 40 while the door forward side 48 contacts the inlet duct 21. Meanwhile, the first arm 76 remains fixed in the open door position depicted previously in FIG. 6A so that the door 44 continues to be lifted away from the aircraft surface 16. Thus, the door 44 acts as a scoop to receive ambient air into the inlet duct 21.

Yet another embodiment of the exemplary inlet door assembly 42 is schematically illustrated in FIGS. 7A–7E. In this configuration, the inlet duct 21 includes a well 96 that is proximate the inlet opening 20. The well 96 includes a sidewall 97 and a shelf 98. The inlet door assembly 42 includes two doors 44, 55 that are each rotationally mounted at one side to the inlet duct 21 and coupled to the actuators 46, 47. The doors 44, 55 are configured to rotate at the coupling point and open side to side, relative to the aircraft body. The first door 44 is configured to rotate into and out of the inlet duct flow passage 40, or proximate and away from the well sidewall 97. The second door 55 is configured to rotate into or out of the inlet duct flow passage 40 as well, but specifically close to and away from the well shelf 98. As shown in the figures, it is preferable that the first door 44 is shorter in length than the second door 55 in accordance with this particular embodiment, however, it will be appreciated that the doors 44, 55 may be either equal in length, or the second door 55 may be shorter than the first door 44, depending on the configuration of the inlet duct well 96.

The actuating mechanisms 46, 47 are coupled to the inlet duct sidewall 38 and to each of the doors 44, 55. Any one of numerous other types of actuators may be used that can be configured to cause the doors 44, 55 to actuate. Each actuator 46, 47 is preferably coupled to or embedded in some portion of the inlet duct 21 but, as will be appreciated, the actuators 46, 47 may be coupled to or mounted on any portion of the inlet door assembly 42. The actuators, 46, 47 are preferably in communication with a control circuit, electronic control unit or any other type of controller (not shown) configured to communicate door position commands to the actuator 46, 47.

Figure 7A:
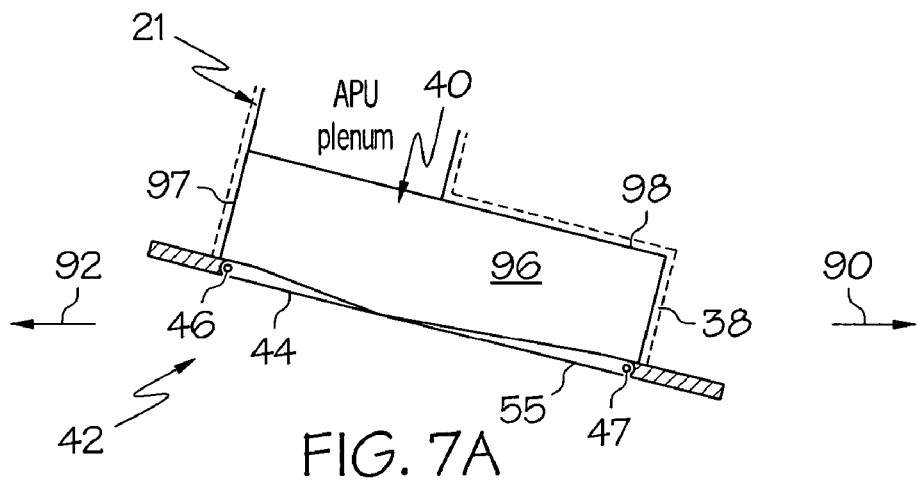
FIGS. 7A–7E are schematics of the APU inlet duct having yet another exemplary inlet door assembly mounted thereon.
Figure 7B:
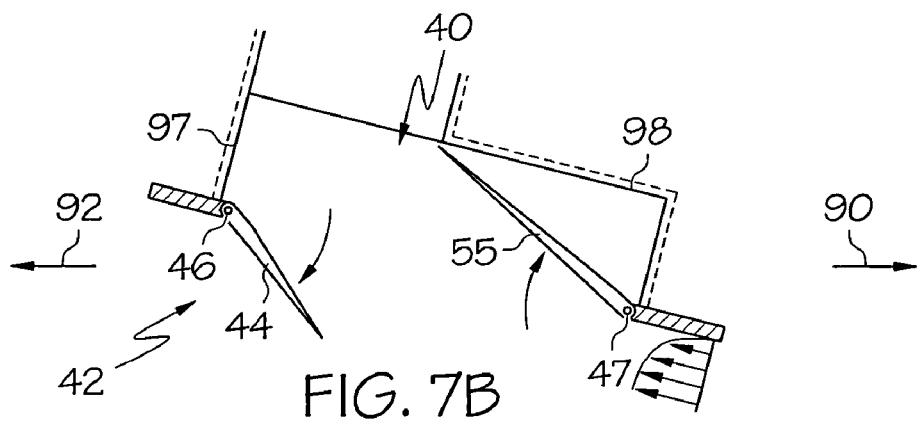
Figure 7C:
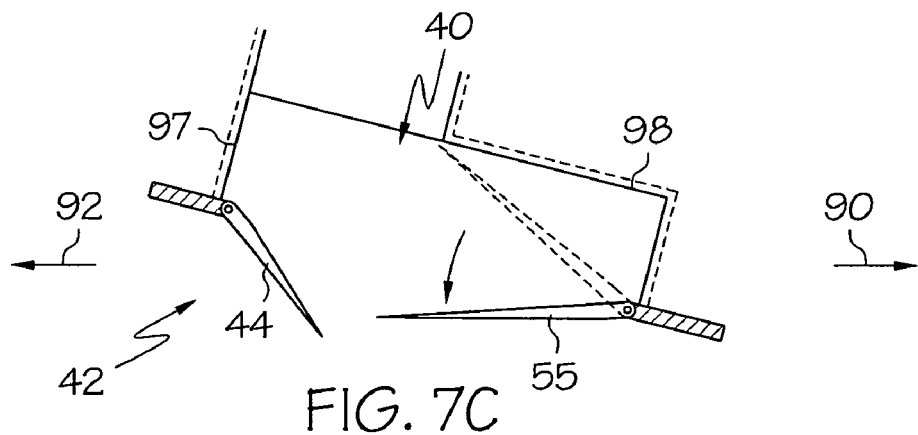

FIGS. 7A–7E illustrate the preferred sequence of operation to achieve the door positions shown in FIG. 7A–7C. When the APU is not in operation, the doors 44, 55 are in a closed position, as shown in FIG. 7A. When the aircraft is in flight, the control circuit communicates position commands to the actuators 46, 47 to cause the first actuator 46 to rotate the first door 44 to an open out position where the first door 44 opens out away from the inlet duct flow passage 40, while the second actuator 47 rotates the second door 55 to an inward position into the inlet duct flow passage 40 proximate the well shelf 98. Thus, when the aircraft is in flight, air is scooped and directed into the inlet duct flow passage 40 via the first door 44. If the aircraft is taxiing on the runway, the control circuit (not shown) communicates new position commands to the actuators 46, 47. First, the control circuit (not shown) instructs the first actuator 46 to remain idle so that the first door 44 remains out of the flow passage 40. Meanwhile, the control circuit (not shown) also causes the second actuator 47 to rotate the second door 55 out of the flow passage 40, illustrated in FIG. 7C. After moving through the position shown in FIG. 7C, the first actuator 46 then rotates the first door 44 into the flow passage 40 proximate the well sidewall 152, while the second actuator 47 remains idle and the second door 55 remains in the open outward position, shown in FIG. 7D.

Figure 7D:
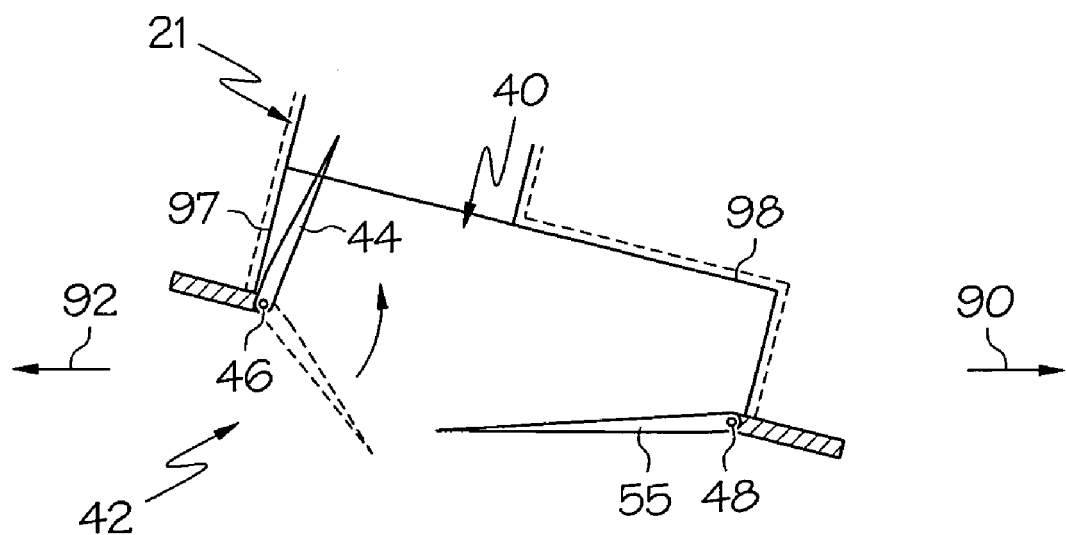
Figure 7E:
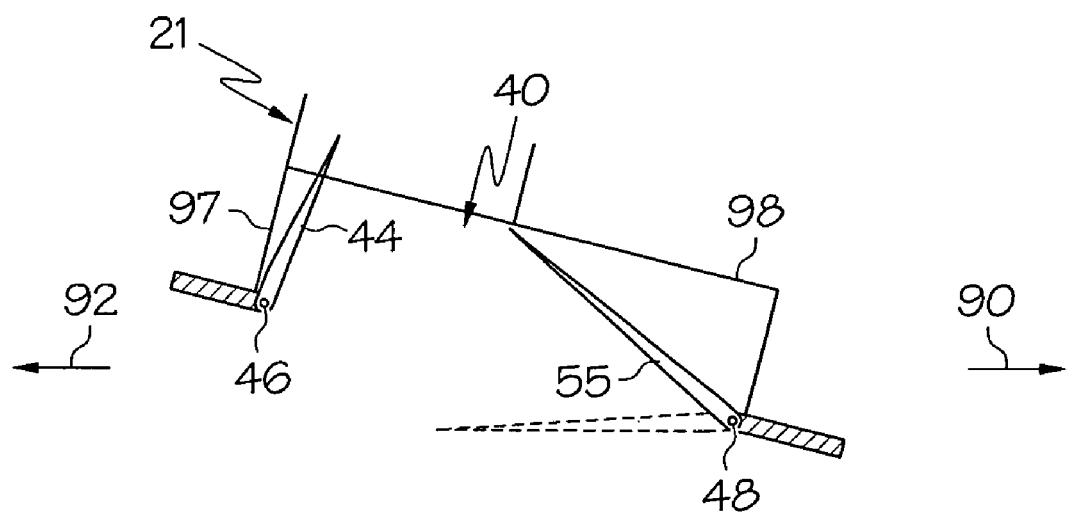

During in flight APU operation, the control circuit (not shown) can send position commands to the actuators 46, 47 to rotate both doors 44, 55 inward to maximize ram air recovery, as shown in FIG. 7E. This position may be achieved from the positions depicted in either FIG. 7B or 7D. From the position in FIG. 7B, the control circuit (not shown) causes the first actuator 46 to rotate the first door 44 into the inlet duct flow passage 40 so that it is proximate the well sidewall 97. At the same time, the second actuator 47 remains idle. Thus, the second door 55 remains proximate the well shelf 98.

From the position in FIG. 7D, the control circuit (not shown) causes the first actuator 46 to remain idle so that the first door 44 remains in the flow passage 40 proximate the well sidewall 97. Meanwhile, the second actuator 47 receives commands from the control circuit (not shown) to rotate the second door 55 inward so that it is proximate the well shelf 98. The position depicted in FIG. 7E is desirable for in-flight low drag operation after the ram air recovery has been initiated.

Figure 8A:
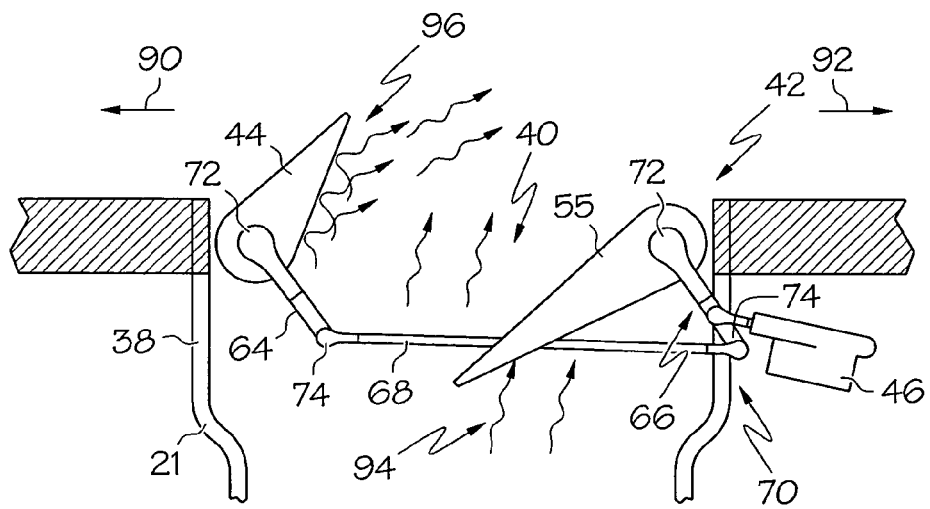
FIGS. 8A–8C are a schematics of the APU inlet duct having yet another exemplary inlet door assembly mounted thereon.
Figure 8B:
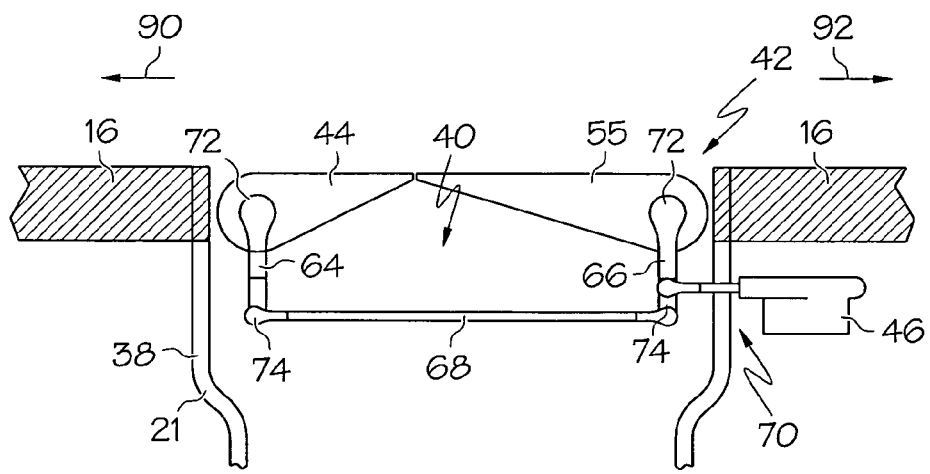
Figure 8C:
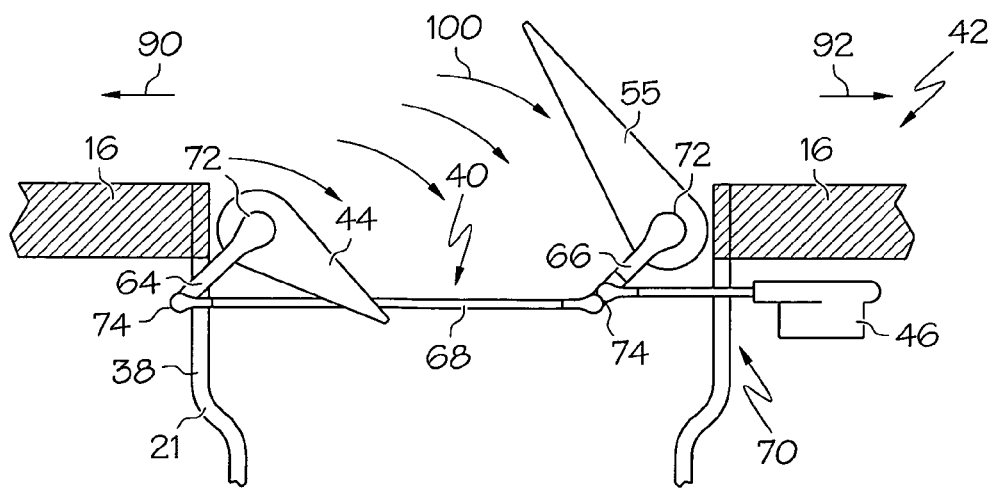

FIGS. 8A–8C illustrate another exemplary inlet door assembly 42 similar to the embodiment shown in FIGS. 7A–7E. However, in this embodiment, the two doors 44, 55 are coupled to the inlet duct 21 and to an actuating mechanism 70, wherein the two doors 44, 55 open the inlet duct 21 either forward 90 or aft 92. The actuating mechanism 70 further includes two joining rods 64, 66 a linking rod 68 and an actuator 46. The joining rods 64, 66 each have a first and a second end 72, 74. Each of the first ends 72 are fixedly coupled to the two doors 44, 55 preferably, on one of the sides of each of the doors 44, 55 so that the ends 72, 74 and doors 44, 55 are coupled at about a 90 degree angle. However, as will be appreciated, the two may be coupled together at any other position on the doors 44, 55 such as to allow each door 44, 55 to rotate into and out of the inlet duct flow passage 40.

Preferably, when the rod second ends 74 are rotated, the doors 44, 55 swing upward or downward, i.e. out of or into the inlet duct flow passage 40. The second ends 74 are each coupled to the ends of the linking rod 68 so that when the first door joining rod 64 is actuated to cause the first door 44 to move into a position, the second door joining rod 66 also actuates, but causes the second door 55 to actuate into an opposite position. For example, if the first door 44 is actuated out of the flow passage 40, the second door 55 will, as a result, actuate into the flow passage 40.

The actuator 46 is mounted within the inlet duct 21 and is coupled to the linking rod 68. The actuator 46 can be any one of numerous types of actuators that can be configured to move either the joining or linking rods 64, 66, 68 to thereby cause the doors 44, 55 to actuate. Additionally, although depicted in the figure as coupling to one of the joining rods 64, 66, as will be appreciated, the actuator 46 may be coupled to any portion of the actuating mechanism 70. Moreover, although the assembly 42 is shown to include rods 64, 66, 68 that are used to actuate the two doors 44, 55, any other actuating mechanism, that achieves the same result may be employed. The actuator 46 is preferably in communication with a control circuit, electronic control unit or any other type of controller (not shown) configured to communicate door position commands to the actuator 46.

Turning to FIG. 8A, an illustration of the inlet door assembly 42 during ground operation is provided. The actuator 46 receives position commands from the controller (not shown). In this embodiment, the actuator 46 pulls the second door joining rod 66 aft 92 causing the second door 55 to rotate into the flow passage 40. Consequently, the linking rod 68 is caused to pull on the first door joining rod 64 such that it also rotates and moves aft the aircraft 92. The first door 44 moves out of the flow passage 40 into an open position. Noise propagates out of the inlet duct 21 with minimal deflection forward the aircraft 90. Specifically, the noise either is reflected off 94 of the inner surface of second door 55 and back into the inlet duct 21 or deflected off 96 of the inner surface of the first door 44 and back towards the aft section of the aircraft 92. Thus, the noise is reflected aft away from aircraft service locations forward of the APU installation while sufficient ram air enters the inlet duct flow passage 40.

The door 44 is preferably in a closed position, such as shown in FIG. 8B, while the APU is not in operation. When the doors 44, 55 are actuated from the position shown in FIG. 8A, the control circuit (not shown) communicates to the actuator 46 to close the door 44, 55 by pushing the second door joining rod 66 forward 90 and causing the second door 55 to rotate upwards so that it is level with the aircraft surface 16. Accordingly, the linking rod 68 causes the first door joining rod 64 to rotate forward 90 so that the first door 44 consequently rotates downward until the first door 44 is level with the aircraft surface 16. Most preferably, the doors 44, 55 are configured to sealingly couple with one another to seal the inlet duct 21 from foreign objects when in close position.

During flight, APU noise is not as much of a concern. However, it is desirable to allow sufficient ambient air into the inlet duct 21 for APU operation, achieved by the door positions shown in FIG. 8C. If opening the doors 44, 55 from the closed position shown in FIG. 8B, the control circuit (not shown) communicates the desired outward position to the actuator 46. In response, the actuator 46 pushes the second door joining rod 66 forward 90 causing the second door 55 to rotate out of the flow passage 40. This movement also causes the linking rod 68 to push the first door joining rod 64 forward 90 to cause the first door 44 to actuate into the flow passage 40. Thus, when the aircraft is in flight, the second door 55 scoops the oncoming air flow and directs the air 100 into the inlet duct 21 for APU operation.

As will be appreciated by those of skill in the art, the control circuit (not shown) can be configured to cause the doors 44, 55 to actuate from the closed position shown in FIG. 8B to the open position shown in FIG. 8A, or from the open position shown in FIG. 8C to the closed position shown in FIG. 8B.

Figure 9A:
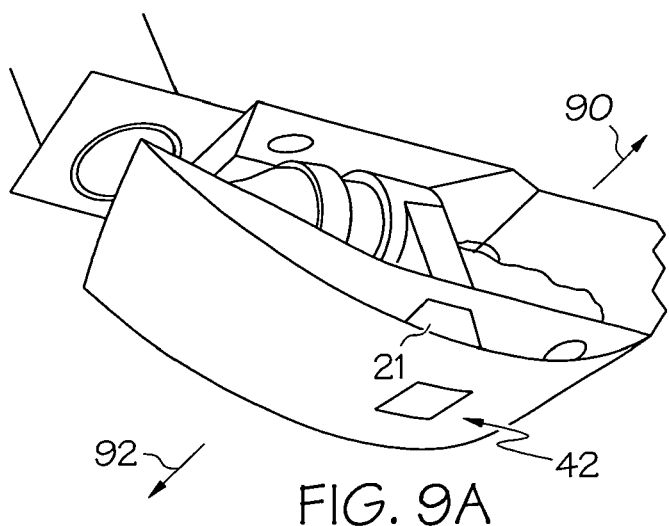
FIGS. 9A–9C are perspective views of the APU inlet duct having yet another exemplary inlet door assembly mounted thereon.
Figure 9B:
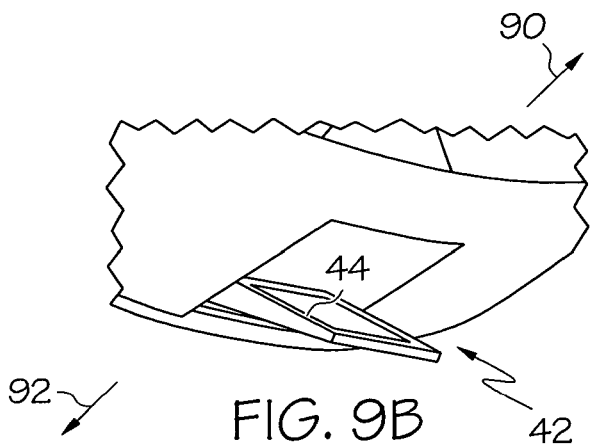
Figure 9C:
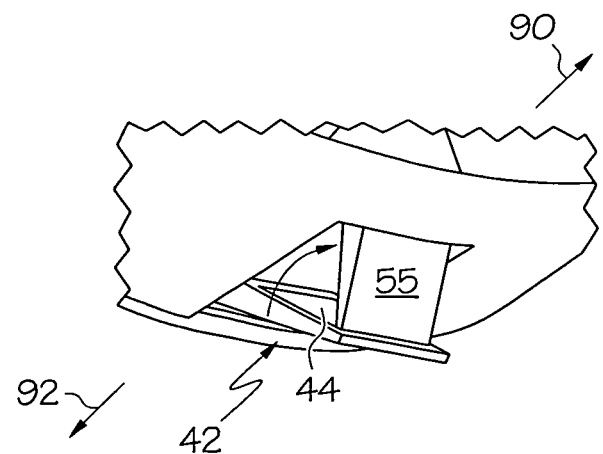

Yet another embodiment of the exemplary inlet door assembly 42 is illustrated in FIGS. 9A–9C. In this configuration, the inlet door assembly 42 includes a main door 44 and a second door 55. The main door 44 is rotationally mounted at its aft side to the inlet duct 21 and coupled to the actuator 46. The main door 44 is configured to rotate into and out of the inlet duct flow passage 40, or proximate and away from the well sidewall 97. The second door 55 is coupled to the forward side of the main door 44. The second door 55 is configured to extend away from the main door 44 to contact the opposite side of the inlet duct sidewall 38 to create a "tent" configuration. As shown in the figures, it is preferable that the first door 44 is longer in length than the second door 55 in accordance with this particular embodiment, however, it will be appreciated that the doors 44, 55 may be either equal in length, or the second door 55 may be shorter than the first door 44, depending on the configuration of the inlet duct well 96.

The doors 44, 55 can be rotated into several different positions depending on which phase of flight the aircraft is in. FIG. 9A illustrates the inlet door assembly 42 in a closed position. The inlet duct 21 is preferably kept closed when the APU (not shown) is not in operation. When the aircraft is in flight, the APU is in operation, and ram air recovery is desired, the doors 44, 55 may be in one of several open configuration. In one open configuration, such as shown in FIG. 9B, the main door 44 is open outwards from the aircraft surface 16 while the second door 55 is not extended and remains flush with the main door 44. This configuration allows ram air to be scooped into the inlet duct 21. Because noise is not a main issue during flight, noise that propagates from the APU can deflect in any direction. In this configuration, the noise is deflected forward the aircraft 90 and to the sides. In another open configuration, shown in FIG. 9C, the second door 55 extends away from the aircraft surface 16 to make a "tent" shape. Ambient air is able to travel into the inlet duct 21, while APU noise is deflected sideways from the open doors 44, 55.

Thus, an improved inlet door assembly has been provided that is configured to achieve multi-positions to meet the requirements of ram air recovery, low ground noise, in-flight low drag, and foreign object damage. The invention also increases the duration for which an APU may operate by allowing the inlet duct 38 to remain open between transitioning between various door open positions. The improved inlet assembly is also low in cost to implement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for reducing APU noise from an APU located within an aircraft housing by an inlet door assembly during aircraft in-flight and ground operations, wherein the inlet door assembly comprises a duct having an inlet port, an outlet port, and a flow passage therebetween through which APU noise propagates, a door having a forward and an aft side, the door rotationally mounted on the duct and configured to selectively rotate between at least a first position, in which at least a portion of the door deflects APU noise in a first direction, and a second position, in which at least a portion of the door deflects the APU noise in a second direction, an actuator coupled to the door, the actuator further comprising an arm having first and second ends, the arm first end rotationally mounted to the duct, the arm second end configured to move into and out of the flow passage, the arm second end coupled to the door, wherein the actuator is configured to selectively raise and lower the door relative to the aircraft housing and rotate the door between at least the first and second positions, the method comprising:

raising the arm relative to the aircraft fuselage to thereby raise the door and open the inlet duct;

rotating the door forward side proximate the aircraft fuselage, during aircraft ground operation; and rotating the door aft side proximate the aircraft fuselage, during aircraft in-flight operation.

* * * * *